3,133,895
PROCESS FOR CURING MIXTURES OF UNSATURATED POLYESTER RESINS WITH α-METHYLSTYRENE AND DIVINYLBENZENE
Helmut Meis and Elisabeth Kob, Lethmathe, Westphalia, Germany, assignors to Rutgerswerke-Aktiengesellschaft, Frankfurt am Main, Germany
No Drawing. Filed June 24, 1960, Ser. No. 38,665
Claims priority, application Germany July 1, 1959
5 Claims. (Cl. 260—45.4)

This invention relates to the treatment of unsaturated polyester resins and it has particular relation to the hardening or curing of mixtures of unsaturated polyester resins with α-methylstyrene.

Unsaturated polyester resins are prepared by reacting unsaturated dicarboxylic acids, if desired in mixture with saturated dicarboxylic acids, with polyvalent alcohols. Other reactive compounds, such as cyclopentadiene can be also built-in in the molecules of unsaturated polyester resins. The unsaturated polyester resins can be subjected to mixed polymerization with certain polymerizable monomeric compounds, particularly vinyl compounds in the presence of polymerization catalysts, particularly organic peroxides and hydroperoxides (see, for example, German Patent No. 967,265). In this mixed polymerization as so-called cross-linking agents e.g. esters of vinyl alcohol, acrylic acid esters, methacrylic acid esters, or styrene, are used. α-Methylstyrene cannot be used in such mixed polymerization, particularly in cold polymerization, because it requires heating to 100° C. for about 8 days in the presence of conventional initiators in order to start gelation of the polymerization mixture.

It has now been discovered that α-methylstyrene can be used as a polymerization component together with unsaturated polyester resins, if the mixed polymerization is carried out in the presence of divinylbenzene. It has been unexpectedly found that the addition of even small amounts of divinylbenzene to mixtures of α-methylstyrene with an unsaturated polyester resin results in curing such mixtures. The effect of divinylbenzene is so considerable that at certain proportions between divinylbenzene and α-methylstyrene the use of activators is unnecessary even at normal room temperature of e.g. 15–25° C. For example, the mixture of 100 parts by weight of polyester resin and 20 parts of α-methylstyrene, described here further below in Example 1, cures upon the addition of 10 parts of divinylbenzene without any addition of a catalyst in 5 hours without any application of heat and pressure.

The amount of divinylbenzene to be added relative to the α-methylstyrene present in the composition to be copolymerized, depends on the conditions under which said composition is supposed to be processed. It has been found that curing can be obtained, without the addition of a catalyst, already upon the addition of 1% of divinylbenzene, based on the weight of α-methylstyrene. Therefore, the amount of divinylbenzene used for bringing about curing of a mixture of unsaturated polyester resins with α-methylstyrene can be varied within wide limits.

The possibility of using the easily available α-methylstyrene and, if desired, carrying out curing without the addition of a catalyst, represents a considerable progress in the art. Mixtures of unsaturated polyester resins with α-methylstyrene remain unchanged even during a considerable period of storage, while in polyester-vinyl compound-compositions containing styrene as the vinyl component self-polymerization of the styrene has to be taken into consideration during storage.

In proceeding according to the present invention a stable mixture of unsaturated polyester resin with α-methylstyrene is used and to this mixture the desired amount of divinylbenzene is added shortly before using the mixture. By selecting the amount of divinylbenzene to be added and, if desired, by the addition of catalysts, any desired curing time can be adjusted at cold curing as well as in curing under heat.

*Example 1*

An unsaturated polyester resin is prepared by heating up to 220° C. 196 parts of maleic acid anhydride and 180 parts of 1,2-propyleneglycol with the exclusion of oxygen and in the presence of 0.03 part of hydroquinone in the reaction mixture to form by esterification an unsaturated polyester resin.

100 parts of this polyester resin are mixed at 120° C. with 20 parts of α-methylstyrene and 10 parts of divinylbenzene. After 5 hours at 20° C. this mixture is cured. At 80° C. curing is completed in 3 hours.

*Example 2*

100 parts of the polyester resin described in the above Example 1, are mixed at 120° C. with 20 parts of divinylbenzene and 10 parts of α-methylstyrene and cooled to 20° C. After the addition of 2% of methylethylketone peroxide and 0.2% of cobalt naphthenate, this mixture cures at 20° C. in 2 hours.

*Example 3*

An unsaturated polyester resin is prepared by esterifying in conventional manner 98 parts of maleic acid anhydride, 148 parts of phthalic acid anhydride and 216 parts of 1,3-butyleneglycol with the exclusion of oxygen and in the presence of 0.043 part of hydroquinone. 100 parts of the polyester resin thus prepared are mixed with 20 parts of divinylbenzene and 10 parts of α-methylstyrene. The resulting mixture is catalyzed with 2% of benzoylperoxide and cured at 80° C. The period of curing amounts to 75 minutes.

*Example 4*

100 parts of the unsaturated polyester resin prepared in the manner described in the above Example 3, are mixed with 30 parts of α-methylstyrene and 10 parts of divinylbenzene and the resulting mixture is catalyzed with 2% of methylethylketone hydroperoxide and 0.4% of cobalt naphthenate. After 60 minutes at 20° C. gelation of the mixture takes place and after further 60 minutes the product becomes solid and insoluble.

The terms "part" and "percent" refer herein to parts and percent by weight, if not otherwise stated.

It will be understood from the above that this invention is not limited to the unsaturated polyester resins, proportions, catalysts, conditions, steps and other details specifically described above and can be carried out with various modifications. For example the amount of divinylbenzene added to the mixture of unsaturated polyester resin and α-methylstyrene is in the range of 1 to 300%, based on the weight of α-methylstyrene. The unsaturated polyester resin and the α-methylstyrene may be used in any desired proportion and I prefer to use for 100 parts of the polyester resin 20 to 100 parts of the α-methylstyrene. The ingredients of the mixture to be co-polymerized may be mixed at elevated temperature or at ordinary room temperature of 15°–25° C. The catalysts used in carrying out the process of this invention are of the conventional type and are applied in conventional manner. It will be also understood that this invention can be applied to any specific unsaturated polyester resin, as additional examples of which the following are mentioned: any polymerizable polycondensation product of dicarboxylic acids with polyhydroxy alcohols, which products contain unsaturation, such as diethylene glycol maleate resin; ethylene glycol maleate resin; diethylene glycol phthalic maleic resin prepared from phthalic acid, maleic acid and diethylene glycol; a resin prepared from 98 parts of maleic anhydride and 68 parts of ethylene glycol; a resin prepared from 106 parts of diethylene glycol and 98 parts of maleic anhydride; a resin prepared from 30.3 parts of diethylene glycol, 13.2 parts of maleic anhydride and 21.7 parts of phthalic anhydride; a resin prepared from 20 parts of ethylene glycol, 29.4 parts of maleic anhydride and 3.3 parts succinic acid. It will be understood that the preparation of these unsaturated polyester resins does not form part of the present invention and these resins are prepared by esterification of the ingredients in accordance with technique well known to those skilled in the art of the unsaturated polyester resins.

What is claimed is:

1. A curable composition of an alpha,beta-ethylenically unsaturated polyester resin which is incapable by itself of cold polymerization with α-methylstyrene, said composition consisting of said alpha,beta-ethylenically unsaturated polyester, α-methylstyrene and divinylbenzene.

2. A curable composition as claimed in claim 1, in which divinylbenzene is present in an amount of 1 to 300% based on the weight of the α-methylstyrene.

3. A method of curing a mixture consisting of α-methylstyrene and an alpha,beta-ethylenically unsaturated polyester resin which is incapable by itself of cold polymerization with α-methylstyrene, comprising polymerizing said mixture in the presence of divinylbenzene therein.

4. A method as claimed in claim 3, in which the divinylbenzene is present in the mixture in an amount of 1 to 300% based on the weight of the α-methylstyrene.

5. A method as claimed in claim 3, in which curing is carried out in the presence of a curing catalyst in the mixture.

References Cited in the file of this patent

UNITED STATES PATENTS

| | | |
|---|---|---|
| 2,677,067 | Johnson et al. | Apr. 27, 1954 |
| 2,818,399 | Drechsel | Dec. 31, 1957 |
| 2,829,191 | Rogers | Apr. 1, 1958 |

FOREIGN PATENTS

| | | |
|---|---|---|
| 715,999 | Great Britain | Sept. 22, 1954 |